United States Patent [19]

Shoaf et al.

[11] 3,956,507

[45] May 11, 1976

[54] SWEETENING COMPOSITION AND PROCESS THEREFOR

[75] Inventors: Myron D. Shoaf; LaMonte D. Pischke, both of Danbury, Conn.

[73] Assignee: General Foods Corporation, White Plains, N.Y.

[22] Filed: Nov. 26, 1974

[21] Appl. No.: 527,329

Related U.S. Application Data

[63] Continuation-in-part of Ser. No. 421,295, Dec. 3, 1973.

[52] U.S. Cl. .............................. 426/96; 426/103; 426/548
[51] Int. Cl.² ...................................... A23L 1/236
[58] Field of Search .............. 426/89, 96, 212, 217, 426/213, 215, 103, 364, 380, 548

[56] References Cited
UNITED STATES PATENTS

| | | | |
|---|---|---|---|
| 3,753,739 | 8/1973 | Cella et al. ...................... | 426/217 X |
| 3,761,288 | 9/1973 | Glicksman et al. .............. | 426/217 X |

*Primary Examiner*—Raymond N. Jones
*Assistant Examiner*—Esther L. Massung
*Attorney, Agent, or Firm*—Bruno P. Struzzi; Thomas V. Sullivan; Michael J. Quillinan

[57] ABSTRACT

APM is discretely dispersed throughout a matrix created by melting a fuseable mass and subdividing it to encapsulate the APM therein.

15 Claims, No Drawings

3,956,507

SWEETENING COMPOSITION AND PROCESS THEREFOR

RELATED APPLICATION

This application is a continuation-in-part of the U.S. Ser. No. 421,295 filed Dec. 3, 1973, for Sweetening Composition and Process Therefor.

BACKGROUND OF THE INVENTION

The present invention relates to a method whereby the dipeptide sweetener APM may be fixed in a dry, dense condition as part of a stable, granular material that is readily blendable and soluble rendering the APM suitable for use in beverage and like food applications.

The dipeptide sweetener now commonly known as APM and identified generally as the methyl ester of L-aspartyl-L-phenylalanine is estimated to have 100–160 times the sweetness of sucrose on a weight to weight basis. Among the limitations of this dipeptide sweetener are slow rate of dissolution and its limited stability in aqueous systems. The modes of decomposition of APM are not too fully understood but it does appear that the reactions that stem from the presence of APM in moisture lead to an unfavorable interaction with other materials such as aldehydes and ketones and also lead to undesired decomposition products.

A further limitation of APM is the flowability of the dipeptide when intermixed with other powderous materials. The flowability of APM in granular mixtures with citric acid and other beverage mix ingredients is poor in that it tends to bridge the remaining ingredients such that the mix will not flow readily or discharge through high speed packaging equipment; when examined microscopically, APM is seen to cluster as "balls" of needles, no doubt explaining this limitation in product flowability; it is not too clear but it would appear as though there is an electrostatic phenomenon which causes such crystals to intermesh and aggregate. Even when the dipeptide per se is ground or it is coground with other materials serving as dispersants, the ultimate mix produced containing such a composition leaves much to be desired in terms of the flowability thereof by reason of the aforesaid properties of the dipeptide itself; the composition tends to pack or bridge and have a high angle of repose.

STATEMENT OF THE INVENTION

In accordance with the present invention a primary object is to provide a new product form for the dipeptide APM wherein the product is both soluble and flowable and has a controllable density rendering it suitable for a variety of technical applications in food mixes, principally naturally sweetened mixes wherein the reduced intake of sweeteners such as sucrose and the like may be desired.

In accordance with its more general precepts the invention involves creating a hot melt (below 370°F) capable of forming a relatively amorphous matrix within which APM crystals are dispersed discretely and thereafter causing that hot melt to undergo cooling to permanently fix the dipeptide in a form wherein the APM is a dispersed phase. The ingredients that may be employed to form this hot melt can vary, the preferred ingredient being citric acid among the class of amorphous food acids; preferably the acids will be of a reduced moisture content and whereas mixtures of anhydrous and hydrous citric acid may be employed for plasticity control as will be described hereinafter, it will be generally desired to maintain the moisture content of all the hot melt ingredients substantially below 10% and preferably below 5%. As an alternative form of hot melt ingredients, polyhydric alcohols such as sorbitol mixtures thereof with other polyols may be employed to like advantage; so too starch hydrolyzates such as corn syrup digests having a dextrose equivalency ranging anywhere from 5–50 typically may be employed as a hot melt ingredient, such materials being generally selected which are characteristically and preferably anhydrous, i.e. glucose. Of all of the foregoing class of matrix forming materials, anhydrous citric acid is the most preferred by reason of its relatively low water activity (Aw) when converted into the molten state.

Preferably the matrix will be formed by subjecting the APM and the matrix material, i.e. citric acid powder, to a high shear in a blender such as a vertical cutting machine, whereafter the blend is sprinkled onto the heated surface of a calendar roll, the roll being part of a pair or multiplicity thereof whose nips are spaced between two and ten thousandths of an inch. The hot melt ingredients are melted on the heat exchange surface of the heated roll and accumulate into a plastic molten mass which in passing the nip are dispersed. Eventually the mass will be doctored from the roll surface and ground after cooling to the intended particle size.

In lieu of a roll fusing operation other means to effect a molten condition and conveniently distribute the APM particles throughout the matrix may be employed such as a Sandvik bed dryer whereon the blend of ingredients is uniformly distributed as a bed onto a heated metal belt; after fusion takes place, there is a cooling effected by a blast of chilling or cooling air directed at the belt, the fused mass being ultimately doctored and ground as in the case of the roll fusing operation. Other convenient means to effect a molten condition will occur to skilled art workers such as extrusion apparatus capable of generating frictional heat to effect fusion through the work generated between an auger and a complementary barrel.

It is believed to be an important and essential aspect of the present invention that the blend ingredients as aforesaid be controlled in the moisture content thereof. Whereas a certain amount of plasticity is desired in order to promote handleability of the molten mass such for instance as by blending anhydrous citric acid with monohydrate citric acid which tends to reduce the temperature at which melting occurs, a control of the amount of moisture either generated or present in the mix should be observed. Roller fusing is one of the simplest and most convenient methods that might be employed, since the moisture content may be readily controlled. Indeed in practicing the invention it is desirable to control the amount of heat energy input to the molten mass so as to avoid decomposition of the APM, the amount of heat exposure being minimized so as to avoid degradation of the dipeptide which is heat sensitive and reactive. Preferably the matrix should not exceed 250°F, although in some applications depending upon the relative amounts of moisture present and the type of matrix material some temperature elevation above 300°F may be practiced provided the duration of heat treatment is reduced. Advantageously a drum drying facility limits the amount of heat energy input to a point whereat the matrix may be safely warmed to a temperature of less than 250°F.

Typically, a blend of 30 to 60 parts citric acid monohydrate to 80 to 50 parts of anhydrous citric acid will be employed as diffusing medium, the mixed melting points of the blends having softening and thermo-plastic properties well below the melting point of the APM. Generally the blend ratio of anhydrous citric to the hydrate form can vary anywhere from 3:1 to 1:3 of these preferred forms. Although one of the more preferred fusing mediums will be an anhydrous citric acid from the stability standpoint, this acid should be altered in its melting characteristics by the addition of other agents such as sorbitol or another lower polyhydric alcohol capable of providing the plasticizing characteristics intended for assuring encapsulation.

The relative amount of APM by weight of the matrix will vary depending upon the ultimate use and it will be optional therefore. In the case of citric acid which is normally and preferably granular for flowability in a beverage mix, it will be practical in accordance with this invention to employ a high level of the dipeptide in the citric acid hot melt and grind the cooled matrix to a fine particle size that is subgranular, say, —50 to +120 U.S. Standard Mesh whereat the composition will be quite flowable with other mix ingredients, mesh size hereinafter also being expressed in the U.S. Standard Screen series.

A further advantage of the present invention is the ability to render edible acids with relatively low rates of solubility more soluble in that acids such as fumaric acid and adipic acid may be employed as the matrix forming materials and have the dipeptide incorporated therein, whence these materials can be finely ground after they have been used as the matrix for the dipeptide. Whereas a finely ground matrix of less soluble acids such as fumaric and/or adipic is not per se more soluble, such an acid matrix when treated as by coating with a suitable surface active agent will be readily dispersible and have its solubility rate thereby hanced for ready solubility. Thus it will be practical to employ common surface active agents as dispersants on less soluble acid matrices serving to contain the dipeptide therein. Art process for preparing such readily soluble finely ground composition are:

Block et al.
  Pat. No. 2,982,653 Issued 5/2/61; Adipic Acid Composition
  Pat. No. 3,011,894 Issued 12/5/61; Fumaric Acid Composition
Raffensperger et al.
  Pat. No. 3,009,811 Issued 11/21/61; Adipic Acid Composition
  Pat. No. 3,009,810 Issued 11/21/61; Fumaric Acid Composition
  Pat. No. 3,016,299 Issued 1/9/62; Fumaric Acid Composition
  Pat. No. 3,016,300 Issued 1/9/63; Adipic Acid Composition
  Pat. No. 3,108,002 Issued 10/22/63; Acid Composition
  Pat. No. 3,152,909 Issued 10/13/64; Fumaric Adipic Acid Compositions A high level of dipeptide may be employed in such matrix materials. A typical level of dipeptide will be an equal part by weight to that of the matrix material per se but the range of these materials may be varied to suit economics and functionality of materials. The type of matrix material forms no part of the present invention except to assure that there is a sufficiently discrete dispersion of the dipeptide throughout the matrix material as well as a physical entrapment thereof through the process of forming the matrix into a molten amorphous mass.

It is believed that the melting of the hot melt ingredients as just described is related to the physical state of the dipeptide sweetener. Whereas initially it is in the form of a needle-like crystal and preferably will be sub-divided preparatory to incorporating into the matrix material, it is believed that the sweetener particles undergo at least a softening. The invention can be practiced in a variety of ways wherein the APM may be partially dissolved and in some applications the dipeptide sweetener may be relatively undisturbed from its crystalline state although it will generally be preferably softened by the fusion treatment. When viewed under a microscope, the APM particles will be seen to be virtually substantially completely imbedded in the matrix solids such that there is no tendency towards impairing flowability and agglomeration is virtually avoided. By the same token, however, the APM retains its solubility through the discrete dispersion of the moieties thereof in the matrix material. Roll fusion is most preferred because in calendaring the APM particles are positively submerged in the matrix.

A most advantageous characteristic of the composition of the present invention is its ability to provide the sweetener in a form having a predetermined sweetness power stemming from the ability to faithfully and accurately size the matrix materials. Thus the matrix can be ground to a predetermined particle size distribution; the composition can be milled to a desired size and will fracture in milling along the lines of fracture for the molten matrix per se. Indeed, the grind can be so fine as to provide a material that will pass a 140 mesh screen, the size of grinding being within the limitations of grinding equipment.

The composition is quite dense, the grind having a density of 0.96 grams per cc at a grind of —70 +120 mesh; such densification minimizes any increase in total product volume enabling a sweetening composition to be employed as part of a mix. having a volume equivalent to that of an unsweetened mix.

BEST MODE

The invention will now be described by reference to the following operative best mode of the invention.

A blend of equal weights of anhydrous citric acid and citric acid monohydrate is prepared. This blend is then added at an equal weight to the APM. The ingredients are mixed using a Hobart blender. The mixed ingredients are then sieved through a No. 8 screen, U.S. Standard Screen Series onto a double drum dryer heated by steam at a pressure of between 22–28 psi, the air temperature above the rolls ranging between 116°F and 122°F. The distance between the drums is maintained throughout at less than eight thousandths of an inch, one foot diameter drums being operated at approximately one revolution per minute.

The material is fused substantially completely as the temperature is elevated to an optimal operating steam pressure of about 26 psi and temperature of 120°F above the roll with minimal browning being observed at the doctor or scraper and maximal fusion of the citric acid; the material is doctored from the drum dryer and collects at the scraping blade in the form of continuous chunks or pieces which are quite frangible while being in an amorphous state. This mass is then ground and sieved to collect fractions of use. The material can be ground to a size where it will pass a No. 40 U.S. Standard Screen.

In a solubility test, particles could be added to water at 45°F and go into solution in 30–35 seconds (employing the −120 +140 mesh fraction). The finely divided material can be blended with flavor and coarser granular citric acid to prepare a beverage mix which is cold-water soluble and quite flavorful. The mix can be hermetically packaged in a conventional polyethylene coated foil wrap under controlled humidity conditions and will be stable and retain its stability for months. The ingredients can be blended and packaged using conventional filling and weighing equipment and will not suffer the problems of bridging or other eccentricities which could interrupt or alter the filling and packing operation.

Having described the preferred embodiments of the invention and its broad aspects, we wish to indicate the applicability of a variety of materials as fusing agents, the suitability of which materials will be dependent on their intrinsic melting characteristics and the use in combination therewith as may be elected of a plasticizing polyol or like material serving to provide flowability and handleability in forming a spreadable matrix within which the APM particles may be submerged and fixed. The class of fusing agents will range from monosaccharides and polysaccharides to proteins and other materials or sources as the following list will indicate:

juice crystals such as freeze-dried or drum-dried orange juice or grape juice;

coffee extract such as freeze-dried or spray-dried extract;

tea extract such as freeze-dried or spray-dried tea extract;

surrogates or substitutes for coffee such as caramelized mixtures of cereal grains and molasses;

vegetable solids concentrate such as tomato purees which have been dried and are high in naturally occurring amorphous polysaccharides;

dairy by-products such as whey;

gellable extracts of alginic or pectinic acid respectively derived from citrus or apple peel or seaweeds such as kelp;

low dextrose equivalent starch polymers, say, having a dextrose equivalency of 5–20 in an intermixture with glycerol or a like polyol;

ascorbic acid and its isomers, i.e. erythorbic acids and their salts;

fuseable gums such as propoxylated cellulose; and protein extracts of animal hide, hoof, bone or feather in the form of gelatin and heratin.

In addition to the foregoing class of materials, other sweetening agents, the so-called artificial sweeteners, have the ability to fuse and serve as a matrix for the APM particles and included in this class of materials will be the sodium and calcium salts commonly referred to as cyclamates; saccharine; glycyrrhizin and mixtures thereof; cinnamic acid.

Another group of fusing agents that would serve as a matrix for the APM particles is the class of relatively hard emulsifiers and triglycerides such as mono- and di-glycerides of hard fats such as stearic acid; also naturally occurring matrix materials such as chocolate liquor.

From the foregoing list it will be appreciated that the invention contemplated is a broad one in the sense that any one of a number of matrix forming materials may be advantageously employed as the continuous phase within which particles of dipeptide may be "fixed". The most convenient forms of fixations will be produced when the hot melt of matrix material is capable of solidifying rapidly and being converted into a molten state rapidly. Thus, the most ideal and preferred types of matrix materials are the acids specified herein, most preferably being citric acid. Moreover, it will be important that the matrix material be of a moisture content substantially below 10% as indicated above in order to assure stability in the fixed composition. It is preferred in effecting this stabilization that the particles be elevated in temperature so that they will soften to the point of being moldable as well as flowable. Thus, in the case of citric acid and its equivalents, such matrix material may be heated to a temperature that is below the melting point of the APM, i.e. below 370°F, and will be the same heating step serve to partially soften the APM particles without degrading same, it being felt important to the present invention that the particles not be heated to a temperature above 374°F incident to the fusion operation.

In this connection, the means for effecting heat transfer and more or less rapid fusion of the matrix materials in intimate proximity with the dipeptide particles will be one which preferably not only warms and fuses the mixture but also tends to densify it as by the pinch between a pair of oppositely rotating heating rolls which serve to submerge the particles beneath the protective confines of the matrix per se and provide a substantially complete calendered encapsulation thereof, thereby providing a more flowable and stable sweetener. Accordingly, any one of a number of heating and rolling apparatus may be employed ranging from a conventional drum dryer that is steam heated to a high speed, three roller ointment mill which is also steam heated, i.e. a Ross Mill, No. 52 LC-4 ½ inch × 10 inches may be employed.

What is claimed is:

1. Process for stabilizing the methyl ester of L-aspartyl L-phenylalanine (APM) into a flowable particulate form which comprises: (a) admixing crystals of APM; (b) a matrix-forming material that is capable of being molten at a temperature at or below 370°F, solidifies into a solid mass when cooled to below its melting point and retains a thermosetting solid condition at ambient packaging conditions to form a matrix; and (c) an effective amount of a surface active dispensing agent that renders said matrix-forming material more readily soluble; heating the admixture to convert the matrix-forming material into a continuous molten condition at a moisture content less than 10% and wherein the APM is discretely distributed; cooling the heated admixture to below the melting point of the matrix-forming material to solidify it; and subdividing the mass to a particulate size wherein the particles encapsulate the APM distributed therein.

2. Process according to claim 1 wherein the molten admixture is calendered before subdivision to submerge the particles of APM.

3. Process of claim 2 wherein said matrix has a moisture content of 5%.

4. Process of claim 1 wherein the matrix is a member of the class mono- and polysaccharides.

5. Process of claim 1 wherein the matrix is a member of the class of edible fusible food acids and mixtures thereof.

6. Process of claim 1 wherein the acid is citric acid.

7. Process of claim 6 wherein the acid is a mixture of anhydrous citric acid and citric acid mono-hydrate.

8. Process of claim 7 wherein the ratio of anhydrous to monohydrate ranges from 0.1:1 to 3.0:1.

9. A stable fixed composition of the methyl ester of L-aspartyl L-phenylalanine (APM) in a flowable particulate form which comprises discretely dispersed crystals of APM encapsulated in a matrix-forming material having less than 10% moisture that is capable of being molten at a temperature at or below 370°F, solidifies into a solid mass when cooled to below its melting point and retains a thermosetting solid condition at ambient packaging conditions, said composition containing an effective amount of a surface active dispersing agent that renders said matrix more readily soluble.

10. Composition according to claim 9 wherein the admixture is in a calendered form that has been granulated.

11. Composition of claim 10 wherein said matrix has a moisture content of 5%.

12. Composition of claim 9 wherein the matrix is a member of the class mono- and polysaccharides.

13. Composition of claim 9 wherein the matrix is a member of the class of edible fusible food acid and mixtures thereof.

14. Composition of claim 13 wherein the acid is citric acid.

15. Composition of claim 14 wherein the acid is a mixture of anhydrous citric acid and citric acid mono-hydrate.

\* \* \* \* \*